Figure 1:
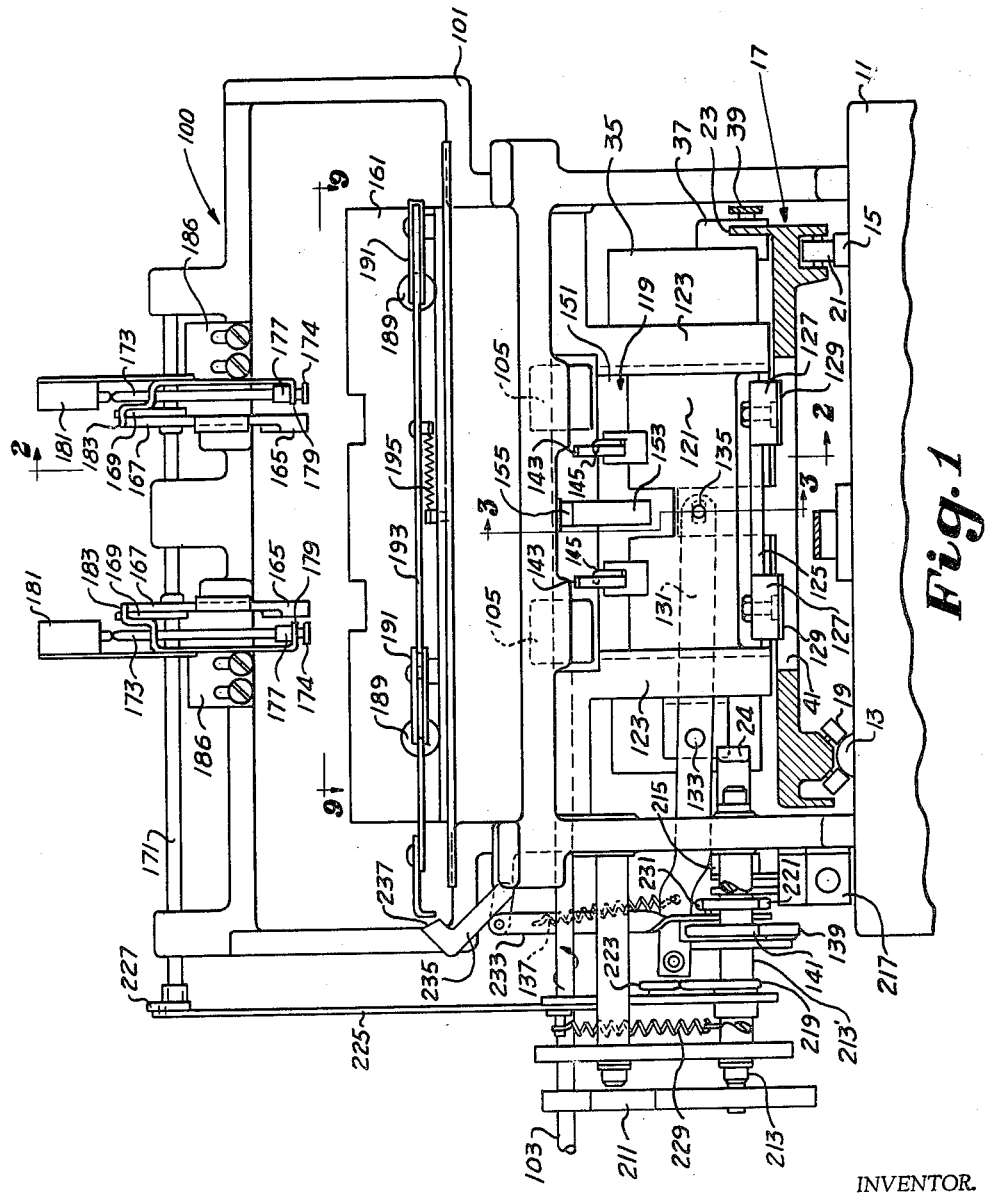

INVENTOR.
ROBERT W. WIRTZ
BY
Russell L. Root
ATTORNEY.

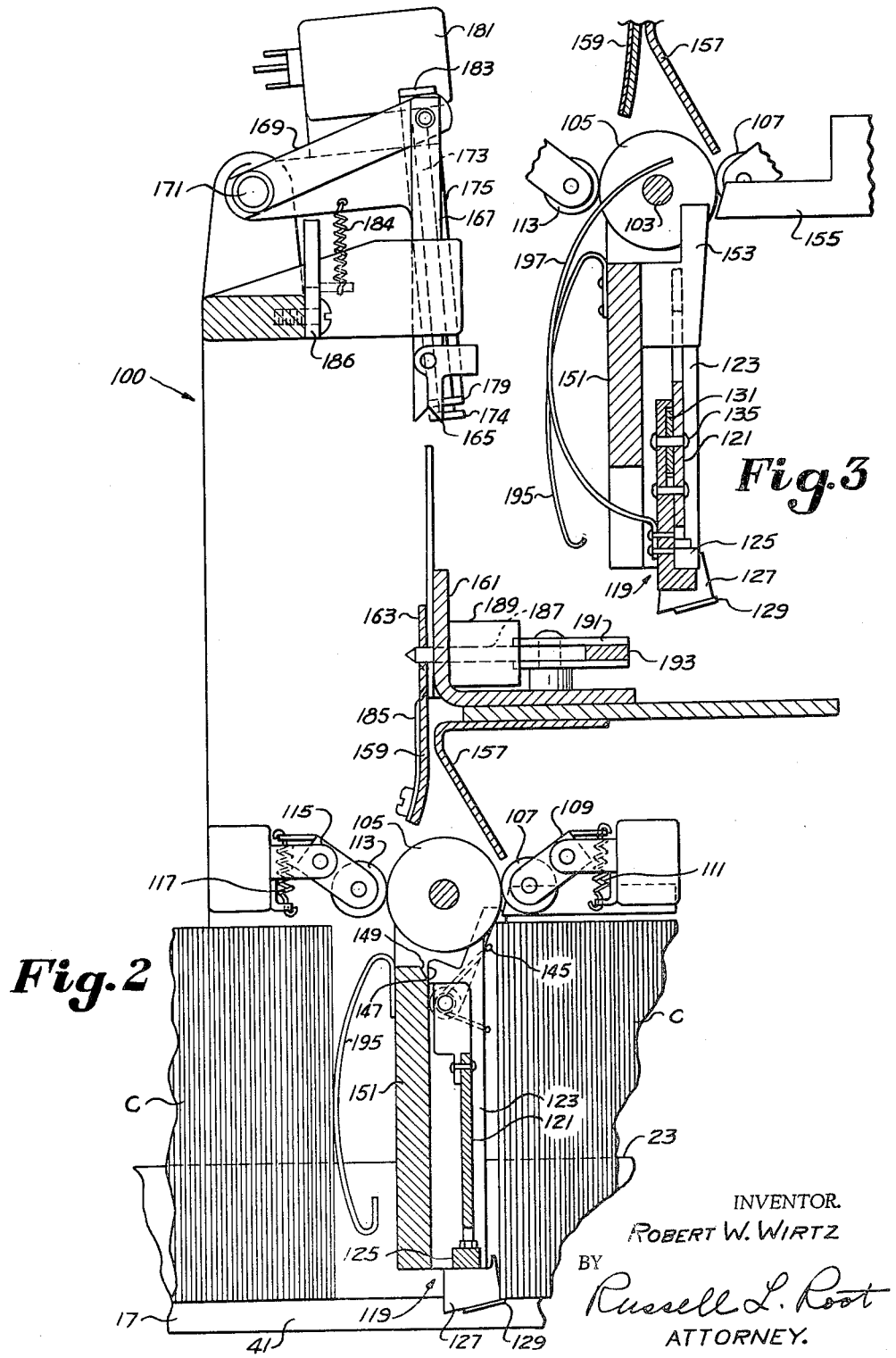

INVENTOR.
ROBERT W. WIRTZ
BY
Russell L. Root
ATTORNEY.

July 13, 1965

R. W. WIRTZ 3,194,549

CARD HANDLING

Filed Aug. 14, 1962

7 Sheets-Sheet 4

INVENTOR.
ROBERT W. WIRTZ
BY
Russell L. Root
ATTORNEY.

INVENTOR.
ROBERT W. WIRTZ
ATTORNEY.

July 13, 1965 R. W. WIRTZ 3,194,549
CARD HANDLING

Filed Aug. 14, 1962 7 Sheets-Sheet 6

INVENTOR.
ROBERT W. WIRTZ
BY
Russell L. Root
ATTORNEY.

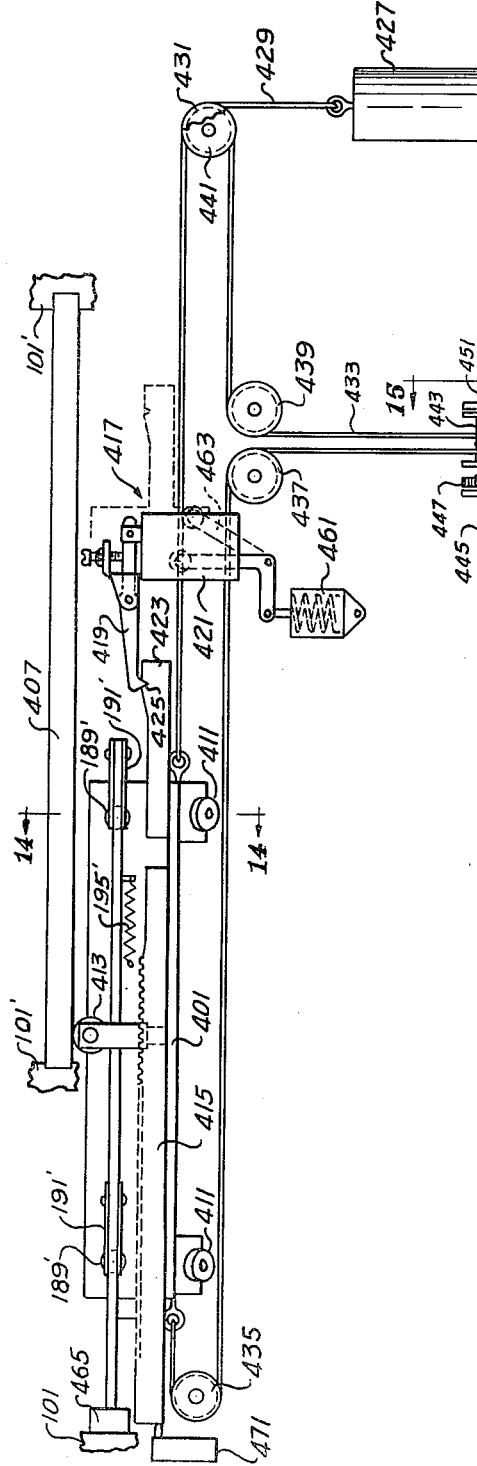

United States Patent Office 3,194,549
Patented July 13, 1965

3,194,549
CARD HANDLING
Robert W. Wirtz, Watchung, N.J., assignor to Varityper Corporation, Newark, N.J., a corporation of Delaware
Filed Aug. 14, 1962, Ser. No. 216,860
21 Claims. (Cl. 271—3)

This invention relates to the handling of cards, and particularly to serially handling the cards of a file or stack of cards. In certain of its aspects it relates to selecting cards from the stack one at a time in their order in the stack, presenting each in turn to a fed position or work position, and then returning it to its position in the stack without disarranging the cards.

It is an object of the invention to perform an operation of the type described and especially to do so in such a way as to realize a very speedy transfer of the cards and at the same time to insure high reliability and freedom from such types of faulty operation as doubles, skips, and jams commonly associated with sheet and card feeding, especially as speeds are increased.

While the over-all speed of processing the stack of cards may not always be directly within the purview of the present invention, since this would depend in part upon the nature of the work to be performed on the card and hence is not directly under the control of the card handling mechanism, it can be appreciated that card handling is still of material significance to the speed the over-all operation. If the card can be very rapidly brought into work position and as rapidly fed away, more time is made available for working on the card and for performing other necessary operations, so that the cycle is shortened with improved speed of over-all output, and improved chances for accuracy in connection with the other operations are also afforded. Furthermore, if a mere handling operation, such as counting is contemplated, then over-all speed is definitely a concern of the present invention.

In accordance with the present invention the foregoing objects have been achieved in part by arranging a supply stack of cards on a movable table or magazine which passes adjacent the feed mechanism. The magazine is urged in a direction to press the incoming stack lightly against a stop. One card is stripped from the stack and fed to working position while another previously fed card is simultaneously returned to the magazine at the opposite side of the feed on the collection end of the magazine. As each card is so fed, the magazine moves through a small distance to place the next card in feeding position and open up a space to receive the next card on the collection end. Thus both the remainder of the supply stack awaiting the feeding operation, and the growing collection stack are at all times maintained in a condition of substantially uniform density so that there is no tendency to slip or spread, or to become too tightly packed, whereby the cards will react favorably to the feeding operation at all times.

The present invention, in another aspect, takes advantage of a single feed element as the prime card mover and makes use of this element to move both the incoming card and the outgoing card in their respective directions with a resultant freedom from the possibility of conflict which is extremely advantageous.

A feature of the present invention in still another aspect thereof, is the provision of a carriage having timed relation to the card feed and acting to carry a fed card from its initially fed position to a remote work station, and then to return it to the fed position for automatic return to the collection end of the magazine.

It is pointed out that throughout the description and the subjoined claims the term "stack" is used to designate an accumulation of cards which are disposed in mutually supporting contiguous face-to-face relationship in such a way that no individual card can be grasped until it has first been suitably displaced laterally from the stack, usually at one end thereof. Similarly, "to stack" denotes placing cards in such relationship to each other.

While I am aware of prior devices which handle a series of articles such as lantern slides disposed in a series of spaced pockets in a magazine by grasping and withdrawing each article in turn from its designated pocket and returning it thereto, it will be readily recognized that the problems relating to such a system are essentially different from those of handling mutually supporting contiguously positioned (i.e. stacked) cards. Moreover, the terms "stack" and "stacking" do not properly denote such a pocketed magazine arrangement and should not be interpreted as covering processes and/or equipment of that sort.

Figure 4:
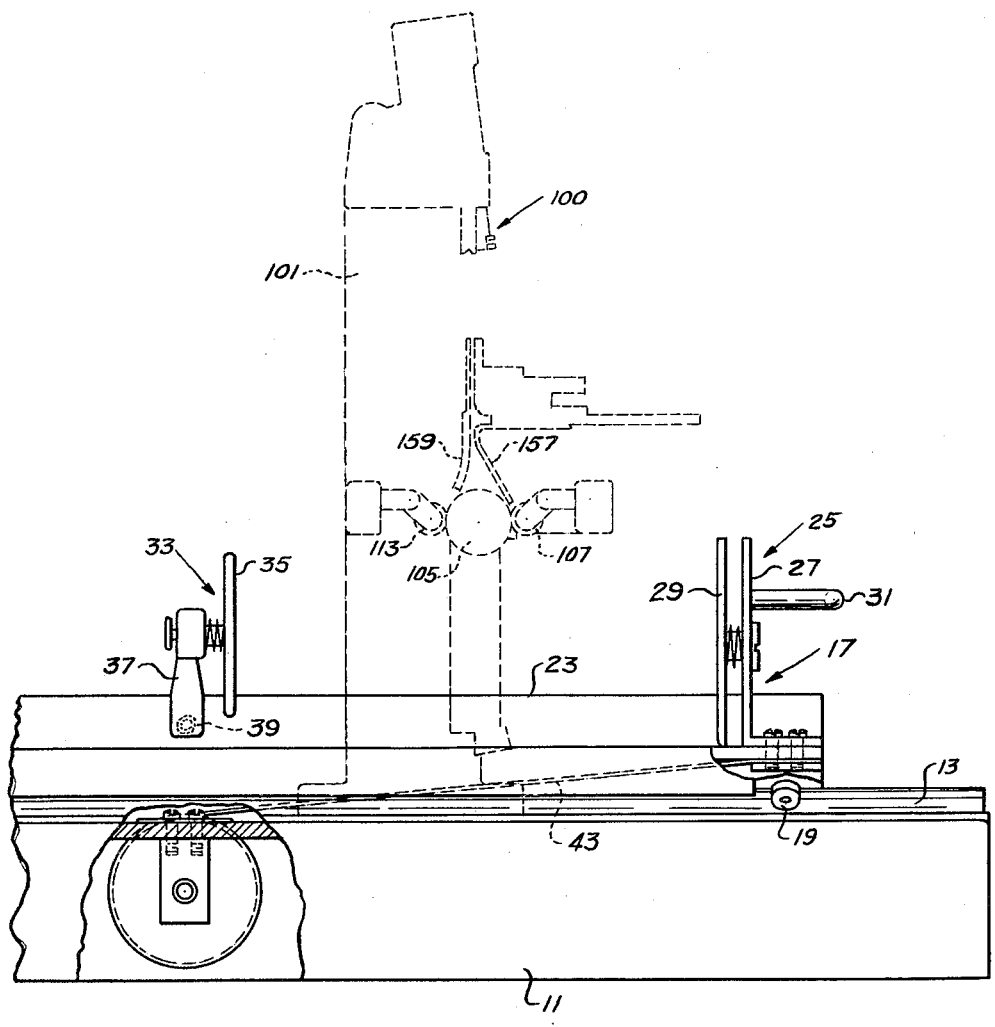
Figure 9:
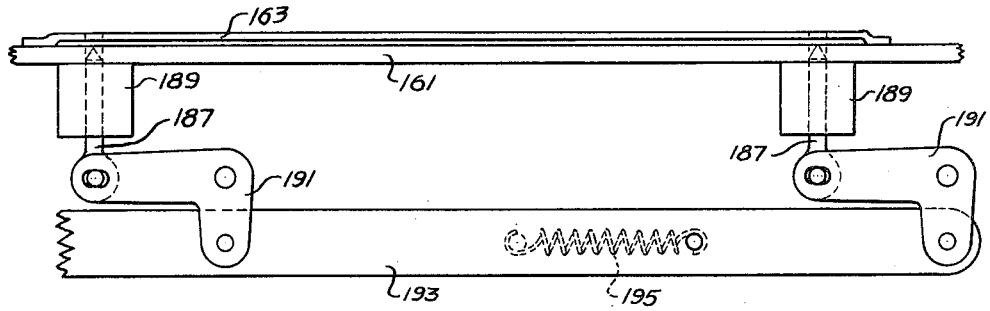
Figure 10:
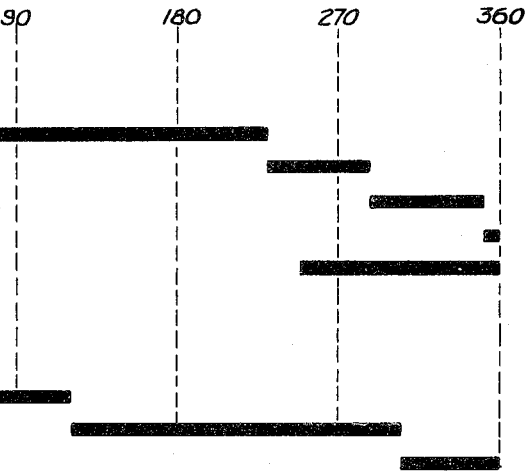
Figure 11:
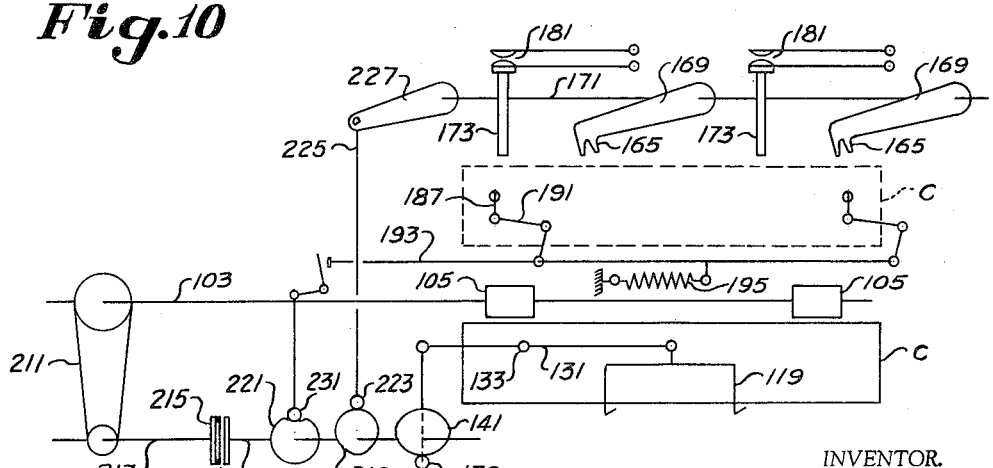
Figure 12:
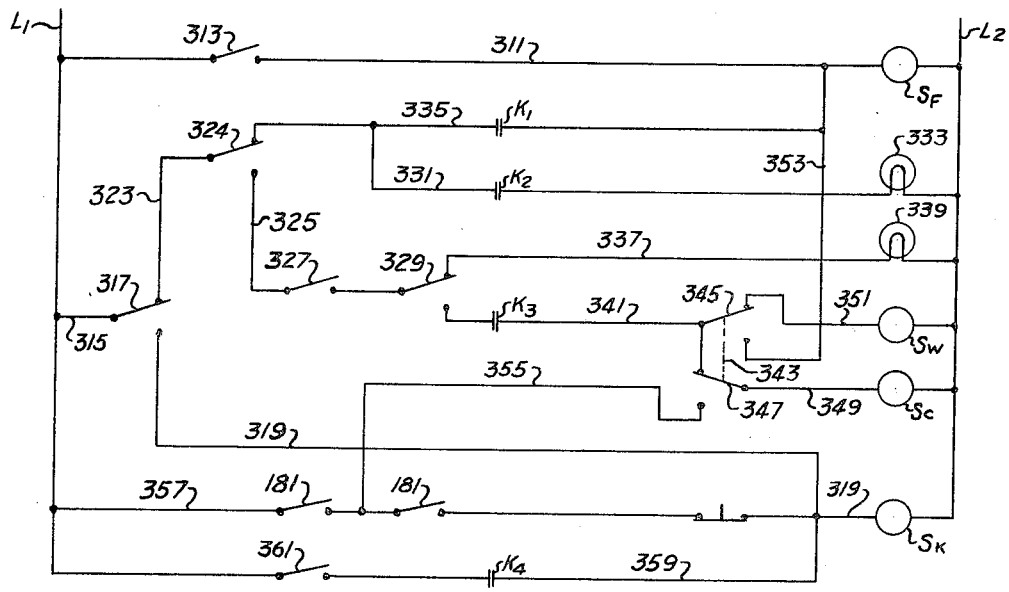
Figure 16:
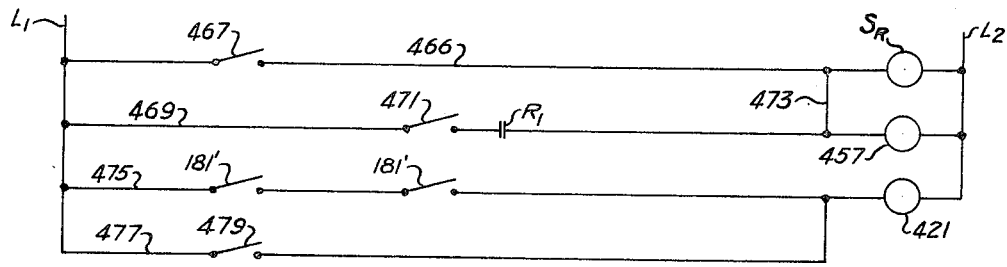

In the drawing:
FIG. 1 is front elevation of a card handling device according to the invention, with the cards omitted and showing a portion of the magazine in transverse section;
FIG. 2 is a partial vertical section of the device of FIG. 1, taken substantially on line 2—2 of FIG. 1, and shown to a larger scale and with the cards in place;
FIG. 3 is a fragmentary section taken substantially on line 3—3 of FIG. 1;
FIG. 4 is a partial side elevation of the device of FIG. 1, taken from the left as seen in FIG. 1, with the feed mechanism shown in phantom and illustrating especially the operation of the magazine;
FIGS. 5 through 8 are fragmentary sections similar to the upper portion of FIG. 2, and illustrating various positions of the parts as the feeding of a card proceeds;
FIG. 9 is a fragmentary plan taken substantially on line 9—9 of FIG. 1 illustrating the details of the pin operating mechanism to a larger scale;
FIG. 10 is a timing chart showing the sequence of operations of the feeding mechanism of the invention;
FIG. 11 is a mechanical diagram illustrating the operation of the feeding device of the invention;
FIG. 12 is a wiring diagram for the card feeding device of FIGS. 1 to 11;
FIG. 13 is a fragmentary elevation illustrating in part an alternative form of the card feeder providing for additional lateral card movement between vertical feeding movements;
FIG. 14 is a detail section to a larger scale taken substantially on line 14—14 of FIG. 13.
FIG. 15 is a fragmentary side elevation taken substantially on line 15—15 of FIG. 13; and
FIG. 16 is a supplementary wiring diagram for the card feeding device of FIGS. 10–13.

Referring to the drawing, a card handling mechanism exemplary of the present invention comprises an elongate base 11 whose long dimension is transverse to the picture plane in FIG. 1. Running lengthwise of its upper surface are rails 13 and 15 which receive a card magazine 17 (FIGS. 1 and 13). Rollers such as those shown at 19 and 21 are provided for facilitating free guided longitudinal movement of the magazine 17 along the rails 13 and 15. The magazine 17 is in the form of a flat carriage upon the upper surface of which a stack of cards C may be laid with the cards in vertical position, edgewise to the magazine surface. One side of the magazine carries a fence 23 against which the cards may be jogged for accurate alignment. One way of accomplishing this is to mount at a suitable point on the frame of the machine a leaf spring tending to urge the cards against the fence 23, and such a spring is shown at 24 in FIG. 1. At one end of the magazine is a pusher assembly 25 including a rigid wall 27 carrying a floating resiliently mounted wall 29 and having a handle 31 which may be best seen in FIG. 4. Toward the other end of the magazine is a back-up assembly 33 comprising a card contacting plate 35 mounted for limited floating movement on a bracket 37 which is clamped to the fence 23, for example by screw 39, and is adjustable therealong for a purpose which will presently appear.

The body of the magazine is characterized by a central lengthwise-extending aperture 41, the purpose of which will presently be explained.

Mounted on the base 11 and straddling the magazine 17 is a feed assembly 100, and the magazine 17 is so related thereto that the same is always urged in a direction such that the pusher assembly 25 tends to move towards the feed assembly 100. This urging is accomplished by means of any suitable equipment such as a weight or spring. In the particular form shown a "Negator" or constant-tension-exerting helically wound spring strip 43 is shown for this purpose. (See FIG. 4.)

The feed assembly 100 includes a frame 101 which rotatably mounts a main drive shaft 103 to which are rigidly connected main feed rollers 105, 105. At one side of each roller 105 is an auxiliary up-feed roller 107 urged against the main roller 105. In the arrangement shown each roller 107 is mounted on a lever 109 actuated by a spring 111. On the opposite side of each main roller 105 is an auxiliary downfeed roller 113 similarly mounted by means of a lever 115 and urged against roller 105 by a spring 117.

Slidably mounted in the frame for restricted vertical movement is a card stripping shuttle 119 whose body is in the form of a plate 121 slidable in grooved vertical edge guides 123 carried by the frame 101. At its bottom the shuttle 119 includes a cross arm 125 to which are connected feet 127 in such manner as to be permitted a slight rocking movement in a horizontal plane. Each foot includes a lip 129 of sufficient extent to engage the edge of the endmost card, but not to extend therebeyond or to come into contact with the next card. The shuttle is reciprocated by means of a lever 131 pivoted to the frame at 133 and having a pin and slot connection with plate 121 at 135. The lever is normally held in shuttle-down position by a spring 137 and can be swung to shuttle-raised position by means of a cam follower 139 connected thereto and coacting with a cam 141 on a cam shaft to be presently described. As can be seen in FIG. 2, when the shuttle is in lowered position, the lips 129 enter the aperture 41 just below the edges of cards held upon the upper surface of magazine 17.

The upper edge of the shuttle plate 121 carries two tampers 143, 143 which take the form of pivotally mounted fingers urged by springs 145, 145 towards retracted position, i.e. towards the left as seen in FIG. 2. The fingers, however, also include cam surfaces 147 which coact with a surface 149 at the upper edge of a fixed frame plate 151 spanning the space between the edge guides 123 for plate 121. Thus, whenever the shuttle 119 is lowered, the tampers 143 are cammed to the right in FIG. 2 and overlie the upper edges of several of the cards next following the one fed, to return them to initial position in case they have been raised slightly by frictional contact with the card being fed upwardly. Whenever the shuttle 119 is raised, on the other hand, the tampers 143 are allowed to retract under the influence of their springs 145 and hence clear the path to permit advancing a card into feeding position.

Separation of a single card at a time from the stack is, of course, intended, and to this end there are provided gate-forming elements, best seen in FIG. 3. Centrally mounted on the frame plate 151 is a face abutment 153 against which the face of the end card of the stack will be forced by the pusher 25. Spaced slightly therefrom is an edge abutment 155 for the upper edges of the cards in the stack. The end of abutment 155 is spaced from abutment 153 by a distance just slightly greater than the thickness of a single card so that only one card at a time can clear the gap and move into feeding position.

From the foregoing description it will be apparent that as the shuttle 119 reciprocates through a small distance it raises each end card C in turn through a short distance and into the nip of the rollers 105, 107 where the card is rapidly fed upwards until it is clear of the rollers. On the return stroke the following cards C are tamped into original position and the lips 127 snap under the edge of the next end card C ready for the next raising action.

Mounted on the frame 101 are throat elements 157, 159 which guide an upwardly fed card towards a desired work station defined in part by parallel guide members 161, 163. As the upper edge of the card is fed between the guide members 161, and 163 by the action of rollers 105, 107 it ultimately comes into contact with spring clips 165 which are at the lower ends of vertically reciprocating links 167, 167, actuated by card moving arms 169, 169 secured to rock shaft 171. At this time the clips 165 will be found in their lowermost position. The motion of the shaft 171 and the arms 169 is so timed, by mechanism that will be presently described, that the edge of a card C is first forced between the elements of the spring clips 165, and thereafter (the card having just left the nip of the rollers 105, 107) the clips 165 are raised to move the card C upwardly into working position.

Figure 8:
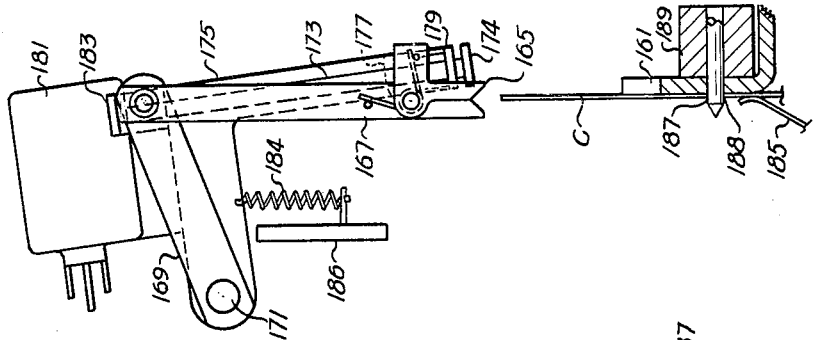
Figure 7:
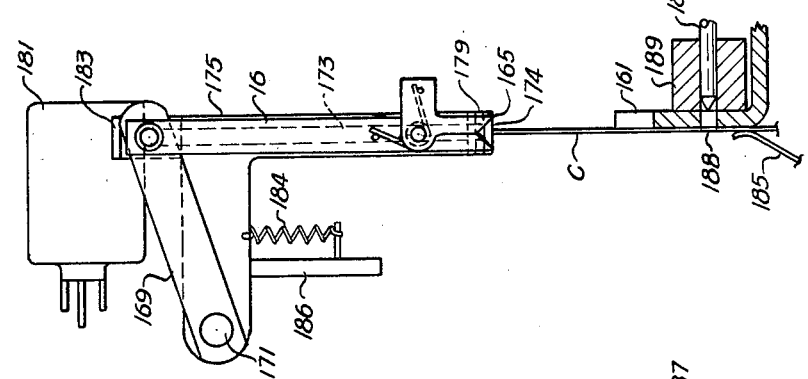
Figure 6:
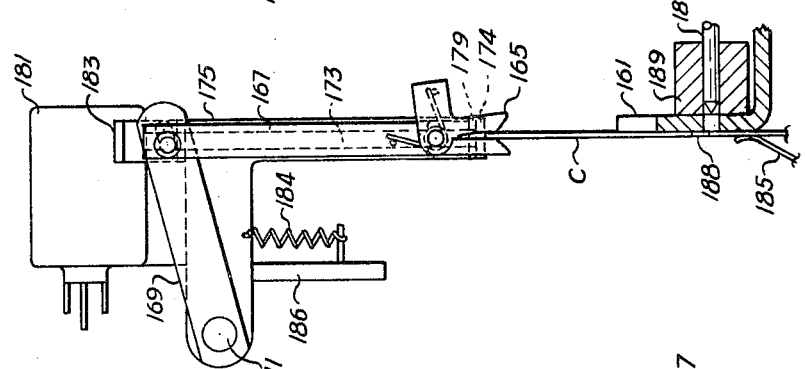
Figure 5:
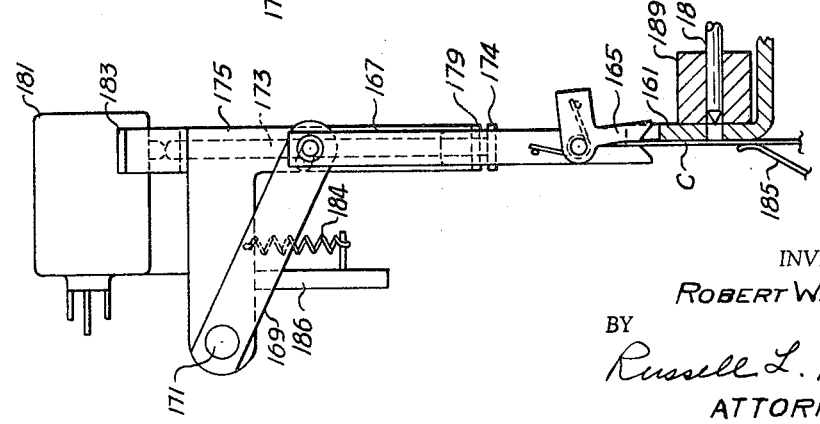

As perhaps best seen in FIGS. 5-8, combined detectors and stops 173 are provided to complete substantially the definition of the working position of the card. The stops 173 are shown as rods having heads 174, which rods slide vertically in suitable guides provided on L-shaped brackets 175. Their sliding motion is limited to a very short stroke by stop collars 177 which, together with the heads 174, cooperate with ears 179 to limit the motion. The upper ends of rods 173 are positioned to operate card position detector switches 181 when moved upwardly for purposes to be subsequently explained. The L-shaped brackets 175 also carry the switches 181, are free to rock upon the shaft 171 and have pick-up ears 183 lying in the path of arms 169 as best seen in FIG. 1. They are lightly urged downwardly by springs 184. The proportions of the parts are such that the edge of a card C being raised by the clips 165, as seen, in FIG. 5 first strikes the heads 174 of detectors 173. The card carries the detectors upwardly until each head 174 is against its ear 179 and the switches 181 are closed (FIG. 6). The detectors, due to the weight of brackets 175 and the urging of springs 184, then constitute stops for the card which prevent its further upward movement and position the card approximately in working position. With the card thus arrested the arms 169 continue their upward motion to free the clips 165 from the card edge, while the latter is retained in its position by one or more leaf spring detents 185 attached to the guide member 163. Ultimately the arms 169 strike pick-up ears 183 and raise the brackets 175 to remove the detectors 173, 174 from contact with the card edge (FIG. 8). This provides for removing any contact from the upper card edge in case tabbed or irregularly edged cards are to be used, and where lateral motion is desired for the purpose of working on the card.

In the foregoing connection it will be noted that adjustable stops 186 are provided on the frame 101 for adjustably determining the lowered position of brackets 175 and heads 174 so that the terminal card position can be set with sufficient accuracy to accommodate the needs of the final positioning pins about to be described. In practice it has been found that the card C should overtravel its final position slightly to allow for a reactionary movement produced by detectors 173 when the clips 165 release. This movement is determinable and can be taken into account by setting the stops 186 at the correct level.

In order to place the card accurately in the desired registered position, the card C is provided at its ends with punched alignment holes 188 in a known manner, and particularly as shown in U.S. Patent No. 2,820,539.

These holes 188 are arranged for cooperation with card positioning pins 187 slidable in pin guides 189 carried by card guide member 161. As shown in FIG. 9, the outer end of each pin is connected to one arm of a bell crank 191. The latter are pivoted to the frame 101 and their opposite arms are pivoted to a common operating link 193. Spring means 195 are provided for urging the link 193 to the left in FIG. 9, i.e. in a direction to move the pins 187 into card engaging position. Other means presently to be described, operate the link at suitable times in a direction to withdraw the pins from the card.

As seen in FIG. 8, then, the card positioning operation is finally completed by the penetration of the holes 188 in card C by pins 187, whereupon the card is accurately located and ready for any work desired to be performed in relation thereto.

The balance of the feeding operation of a card C consists in withdrawing the pins 187, lowering the arms 169 with links 167 and clips 165 whereupon the latter act as pushers to lower the card until its bottom edge strikes the roller 105 and is carried ultimately into the nip of rollers 105, 113. The card is then rapidly fed downwardly and into a space between the frame plate 151 and the card contacting plate 35 on the magazine 17. To guide the card smoothly into this position, leaf spring guide fingers 195 and 197 upon the frame plate and upon shuttle 119 respectively, are provided. As the cards C accumulate at this end of the magazine 17, each subsequent card will be inserted by the feed rollers 105, 113 between the previous card and the leaf spring guides 195, 197 as the magazine 17 moves gradually towards the left in FIG. 2 to provide room, and to close upon the diminishing stack of cards waiting to be fed.

The generating of the movements previously described in proper timed relation to each other is brought about by a series of cams best seen, perhaps in FIGS. 1 and 11. The main drive shaft 103, through a sprocket belt drive 211, continuously drives a shaft 213 which is rotatable on the frame 101 and is drivingly associated with one end of a single revolution clutch 215 arranged to be tripped periodically by a feed solenoid $S_F$. In the form shown in FIG. 1, the drive is folded back upon itself for compactness so that the take-off end of clutch 215 drives a sleeve 213' telescoped over the shaft 213 which sleeve is drivingly connected to the cams. The sleeve 213' is, of course, drivingly connected to cam 141 previously described, which operates the shuttle 119, and to additional cams 219 and 221. Cam 219 cooperates with a follower 223 which actuates a link 225 pivotally connected to an arm 227 which is fastened to and rocks the shaft 171 to ultimately effect the requisite motion of arms 169. The follower 223 is maintained in contact with cam 219 by means of a spring 229.

Motion of the pins 187 is controlled by the cam 221 which cooperates with a follower 231 connected to a vertical push rod 233 normally spring urged downwardly. For convenience the spring 137 (which is used for urging lever 131 upwardly) may be used for this purpose also as shown. The upper end of rod 233 is pivoted to a ball crank 235 rockable on the frame 101 and embodying a pad 237 arranged adjacent the end of the operating link 193 and positioned to move the same against the force of spring 195 to retract the pins 187 whenever the follower 231 is on the high part of the cam 221.

The time during which the various motions take place is set forth in detail in the chart shown in FIG. 10 in terms of the number of degrees of rotation of sleeve 213' within each 360° cycle of operation which represents one revolution as effected by the single revolution clutch. The zero position is the stationary position shown in FIGS. 1, 2, and 10 with a card C in work position. As can be seen from the chart each cycle effects the feeding of a first card out of working position and the simultaneous feeding of the next card into working position with the exception, of course, of the first and last cycles of a stack. The chart of FIG. 10, in view of the legends at the left, is deemed self-explanatory.

FIG. 12 illustrates a preferred wiring diagram, with suitable interlocks and controls, for operating the device of FIGS. 1 to 11. The power supply conductors are represented by $L_1$ and $L_2$. A conductor 311 forms a series circuit including the feed solenoid $S_F$ and a feed control switch 313 which may be actuated in any suitable way, preferably automatically in response to a work operation, to trigger a card feed operation whenever the work operation, whatever it may be, is completed.

Extending from $L_1$ is a conductor 315 connected to the blade of a start switch 317. The switch has a "start" contact connected by a conductor 319 in series with solenoid $S_K$ which operates a control relay having a plurality of simultaneously operable switch contacts to be presently described. The switch 317 also has a "run" contact connected by a conductor 323 to the blade of a card sensing switch 324 which merely senses whether any card is in the feed throat of the machine. If one or more cards are sensed, the blade is moved so as to touch a "card" contact which is associated with a pin sensing circuit. If no card is sensed, the blade is moved so as to touch a "no card" contact in an indicator circuit. The "card" contact is connected by conductor 325 with a "pin read" switch 327 which is in series with a "pin-sensing" switch 329. A conductor 331 leading from the "no card" contact provides a circuit for a "no card" indicator lamp 333. A branching conductor 335 provides a parallel energizing circuit for feed solenoid $S_F$ under certain circumstances. Reverting to the "card" contact, the "pin read" switch 327 represents a switch normally open but held closed whenever the cam 221 or linkage 233, 235 is in a position such that the pins 187 ought to be extended, and the "pin sensing" switch 329 is one which senses directly whether the pins 187 (or the operating linkage 191, 193) are actually in pin-projected position. The blade of switch 329 completes a circuit via conductor 337 through a "pin out" indicator lamp 339 whenever the pins 187 are not extended, and makes contact with a conductor 341 whenever the pins are extended. The conductor 341 branches through a manually operated double pole, double throw switch 343 having blades 345 and 347. One branch of the conductor goes to the blade 345 and the other to one of the contacts for blade 347. The blade 347 is connected to a conductor 349 which completes a circuit to a counter solenoid $S_C$. When switch 343 is thrown one way as shown in FIG. 12, blade 345 is against a contact which completes a circuit via a conductor 351 through a work triggering solenoid $S_W$ which may be used to trip automatically the work operation on the fed card, and blade 347 is completing the circuit from the pin sensing switch via conductor 349 to the counter solenoid $S_C$. When switch 343 is thrown the other way ("count only" position), blade 345 makes contact with a conductor 353 which provides an alternate path to the feed solenoid $S_F$ while blade 347 connects the counter solenoid with an auxiliary count tripping circuit including a conductor 355, one of the switches 181, and a conductor 357.

As can be seen from FIG. 12, the control relay solenoid $S_K$ is also served by two alternate circuits in addition to conductor 319 mentioned above. In one of these, conductor 357, both card position detector switches 181 and a manual stop switch are in series. The other is represented by a conductor 359 interrupted by a holding contact $K_4$ of the relay represented by solenoid $S_K$, and by a hold breaking switch 361 which is closed for most of each revolution but is allowed to open briefly late in each revolution (just before the card would normally close switches 181) to de-energize solenoid $S_K$ and drop out the control relay. Control of this switch can be conveniently effected by having the switch of the normally open type, held closed by the pin cam 221 and positioned at an appropriate angle to open by the brief low point in the said cam at about the 270° position thereof.

The control relay represented by solenoid $S_K$ includes three additional sets of contacts. Two of these, designated $K_1$ and $K_3$, are closed by solenoid energization and interrupt conductors 335 and 341 respectively. The other contact set, $K_2$, interrupts conductor 331 and is opened by solenoid energization.

In the operation of the above described equipment, the magazine is drawn back by handle 31, a supply stack of cards C is placed between plate 29 and the feed assembly 100, and the handle released so that the stack of cards is pressed into feeding position. Then card contacting plate 35 is adjusted so that it is in light contact with leaf springs 195, 197 so as to be ready to receive the first card when returned to the magazine.

Switch 317 is next placed manually in "start" position to energize control relay solenoid $S_K$ and close its holding contact $K_4$, and then is returned to "run" position and through the "no card" contact of switch 324 (since no card is yet in the thoat) completes a circuit to feed solenoid $S_F$ to trip the clutch 215 and commence a cycle. The machine then shifts over to normal running status with swtch 324 on its "card" contact and one card being fed down and the next card being fed up simultaneously during each cycle. At the end of the cycle the counter solenoid $S_C$ is operated and the work triggering solenoid $S_W$ is also operated to trigger the desired work operation. When the work operation is completed it may automatically close switch 313 to trigger another feed cycle. So long as the feeding operation proceeds as intended the cards will be rapidly fed from one end of the magazine 17 to the other until the complete supply stack has been fed through to form the collection stack. As the last card is fed down, and a new card fails to close switches 181 on the simultaneous upfeed, a point will be reached at which the hold breaking switch 361 will have been opened and all circuits to control solenoid $S_K$ thereby broken. This will open contacts $K_3$ so that work triggering solenoid $S_W$ will not be energized and the operation will halt at the end of the cycle. At this point switch 324 will take the "no card" position and contacts $K_2$ will be allowed to close due to the relaxation of solenoid $S_K$, thereby giving a "card absent" indication at lamp 333. No such indication is given during starting because the switch 317 is being so held as to energize the control relay solenoid $S_K$ and thereby break the circuit to lamp 333 via contacts $K_2$.

As can readily be seen, if a card fails to position itself properly during the feeding so that both switches 181 fail to close simultaneously, or if a card fails to feed and the throat is left empty so that switch 324 is thrown to "no card" position, then the operation will be arrested in similar fashion, in the first instance without giving a "no-card" indication at lamp 333 since the card sensing switch will still be able to detect the presence of a card.

In case the pins 187 fail to extend properly at the time intended (indicating improper postioning of a card) switch 329 will fail to close and hence will not give the work-triggering pulse to solenoid $S_W$ and the operation will stop at the end of the cycle, switch 329 then being in a position to close a circuit through lamp 339 to indicate failure of the pins to operate. Since the pins are retracted during most of the cycle, series switch 327 is provided to prevent lighting of the lamp 339 unless the switch 329 is actually completing the lamp circuit when it is supposed to be opening it.

It will be readily seen that by throwing switch 343 to the position opposite to that shown in FIG. 12, the feed solenoid $S_F$ will be triggered directly from the pulse from switch 329 instead of indirectly through the work performing mechanism and switch 313. Accordingly, the feed will proceed very rapidly with no delay, as would be desired if a count of the cards in a stack were all that was required. The simultaneous movement of blade 347 avoids creation of a feed-back circuit which could introduce a miscount.

The mechanism described to this point is intended primarily for a direct up-and-down feeding action as would be used, for example, if the cards were merely carrying lines of indicia to be photographically copied at the working station. It will be appreciated, however, that in some cases it may be advantageous, after the card is fed up to the primary "working" position, to laterally shift the same to another or secondary working position sufficiently remote from the bulk of feeding equipment to provide for one or more other operations. Modifications in the equipment suited to this end are shown in FIGS. 13 to 15 which represent a change in the feed throat mechanism to make that portion of the same surrounding the upwardly fed card and carrying the positioning pins, laterally movable. In FIGS. 13 and 14 it will be seen that throat forming portions 161 and 163 are replaced by portions 161' and 163' mounted on a carriage 401 which is shiftable laterally of the magazine 17. Pins 187' are carried in guides 189' and are actuated by bell crank levers 191' actuated by an operating link 193', spring urged to the left by a spring 195'. The carriage 401 is guided in its lateral movement by rails 403, 405, and 407 suitably secured to the frame 101, perhaps suitably modified to provide support for additional parts as indicated at 101'. Rollers 409 and 411 respectively run in contact with the rails 403 and 405, while a spring-pressed roller 413 engages upwardly against rail 407 and keeps the carriage in position.

The carriage 401 may, if desired, be arranged to move laterally between two fixed positions, but for the purpose of this description it is shown as usable also as a steppable typewriter carriage whereby it can perform the dual function of lateral card shift and incremental letter space movement. To this end the carriage 401 includes a rack 415 which is cooperable with pulsed pawl escapement 417 consisting of a pawl 419 and a solenoid 421 connected with a suitable typewriter mechanism, for example, to step the carriage one tooth on the rack 415 each time a pulse is sent to the solenoid 421. An additional detent element in the form of plate 423 with notch 425 is also provided on the carriage, the notch 425 being so positioned that when engaged by pawl 419, as seen in FIG. 13, the carriage will be latched in normal position corresponding to the fixed card throat of the previous views.

The means for actuating the carriage in a lateral direction includes a weight 427 suitably connected to the carriage by a belt 429 trained over a pulley 431. This arrangement tends to urge the carriage to the right as seen in FIG. 13. For moving the carriage to the left there is provided a cable 433 connected at its opposite ends to opposite ends of the carriage 401, trained over pulleys 435, 437, 439, and 441, and arranged with its central portion wrapped in taut fashion about a drum 443. The drum 443 is mounted adjacent a continuously rotating drive shaft 445 which carries a gear 447. Drum 443 is driving connected to a gear 449 coplaner with the gear 447, and both the gear 449 and drum 443 are carried on a swinging bracket 451 so that gear 449 can be moved into and out of mesh with gear 447. The bracket 451 is normally held in the out-of-mesh position against a stop 453 by a spring 455, and a solenoid 457 is provided for moving the bracket to in-mesh position in opposition to the spring 455.

When the parts are in the position shown in FIG. 13, a pulse applied to solenoid 457 releases the pawl 419 from notch 425 and the carriage starts to move out to the right under the influence of weight 427. In order to prevent shock when the pawl 419 engages the end tooth of rack 415, there is provided a dashpot 461 actuated by a lever 463 lying in the path of carriage 401 to check the motion and ease the contact.

It will be understood that basic mechanism shown in the other views and the electrical circuitry shown in FIG.

12 applies with very little change to the modified arrangement of FIGS. 13 to 15. It may be noted by way of explanation, however, that since the carriage 401 is movable it is no longer necessary to provide means to operate the pin link 193' which can be actuated merely by contact with a suitable pad 465 on the frame 101 as the carriage 401 moves into and out of home position. Accordingly the pin read switch 327 may be closed by departure of the carriage 401 from home position instead of by action of a pin-operating linkage.

FIG. 16 illustrates an auxiliary electric circuit suitable for controlling the movements of the carriage 401 in relation to the other functions of the machine. Across the power mains $L_1$, $L_2$ is connected the solenoid $S_R$ of a carriage return relay in series with a conductor 466 and a switch 467, which may be a limit switch or any other switch which is closed when the carriage has gone far enough and it is time for it to return. Another conductor 469 completes a circuit via a home limit switch 471, hold contacts $R_1$ of the relay actuated by solenoid $S_R$, and the carriage return solenoid 457. A branching conductor 473 connects a point on conductor 466 between switch 467 and relay solenoid $S_R$ with a point on conductor 469 between relay contact $R_1$ and carriage return solenoid 457. Conductor 475 provides a series circuit between $L_1$ and $L_2$ which includes auxiliary blades 181', 181' operated at the same time as card position detector switches 181 heretofore described, and the escapement solenoid 421. A parallel path conductor 477 bypasses the switches 181' and includes a switch 479 which may be actuated by character bars or the like for sending an escapement pulse to the solenoid 421.

The operation of the device with the modifications illustrated in FIGS. 13–16 will be understood as being the same as the form previously described in all major respects. The differences include the following features. When a card is fed into proper position by the action of feed rolls 105, 107 and clips 165 as previously described, closing of sensing contacts 181' momentarily energizes solenoid 421. This raises pawl 419 releasing the carriage 401 for movement to the right under the influence of weight 427. The carriage may move a full stroke to a fixed work position, or preferably, as shown, to a preliminary work position where it is stopped by the pawl 419 against the end of rack 415 (in cooperation with dashpot, mechanism 461, 463). In the form shown, progressive work signals such as mechanical pulses inspired by the actuation of the character bars of a writing machine will then repeatedly trigger solenoid 421, for example by closing a switch such as switch 479 for brief uniform periods of time. This will cause pawl 419 to escape the teeth of rack 415 one at a time until the work is completed. Completion of the work is arranged in any suitable way to actuate a switch 467 which completes the circuit to carriage return solenoid 457 causing gears 447 and 449 to mesh and thereby driving the carriage 401 towards home position. Simultaneously, of course, the relay solenoid $S_R$ is energized closing hold contacts R, which provide a holding circuit for solenoid 457 via home limit switch 471 (which is closed when the carriage 401 is away from home position). As the carriage 401 finally reaches home position the limit switch 471 is operated, and solenoid 457 is de-energized to disengage gears 447 and 449 and thus stop the carriage drive. At the same time, pawl 419 drops into notch 425 and holds the carriage in home position so that the parts are now in position for another feed cycle.

It will be understood, of course, that in the form of the invention set out in the immediately foregoing description the control functions of certain of the parts of the circuit of FIG. 12 may be slightly modified to advantage. For example, the feed control switch 313 may be closed by the return of the carriage 401 to home position, and the work completion function used instead to trigger return motion of the carriage to home position via switch 467 as aforesaid.

From the foregoing description it can be seen that the present invention provides a card feed mechanism of unusual flexibility and accuracy which will provide for the rapid and automatic feeding of individual cards from a stack to an accurately determined work position and back into a similarly arranged stack under conditions such that the cards are always under full control.

While the forms of the invention shown and described herein are admirably adapted to fulfill the objects primarily stated, it is to be understood that it is not intended to confine the invention to the forms disclosed herein, for the invention is susceptible of embodiment in other forms and variations. It will be understood, therefore, that the invention is claimed in any of its forms or modifications falling within the spirit and scope of the language employed in the appended claims.

1. A method of handling cards which comprises (1) stacking the cards to form a supply stack and placing the stack edgewise of the cards on a support; (2) placing the support so as to present the supply stack endwise to a feeding point; (3) separating and feeding a card edgewise from the presented end of the supply stack normal to the support to a fed position (4) stopping the card and then feeding it in a reverse direction in its own plane back onto the surface of the support member edgewise thereof to form part of a collection stack on the same support member, with card planes parallel to those of the supply stack and with its card receiving end closely adjacent but slightly spaced from the presented end of the supply stack.

2. A method as set forth in claim 1 wherein each card, other than the end cards of the supply stack, is fed from the stack simultaneously with the return to the collection stack of the previous card, and returned to the collection stack simultaneously with the feeding out of the subsequent card from the supply stack.

3. A method as set forth in claim 1 which includes the steps of translating the card edgewise laterally of its withdrawal motion to a work station after feeding it from the supply stack and before restoring it to the collection stack; and working on the card while at said work station.

4. Card handling mechanism comprising a magazine having a stack supporting surface lying in a plane for holding a first stack of cards to be fed to a fed position and for storing the cards in a second stack whose card planes are parallel to those of the first stack as they are collected upon return from the fed position; and a card feeding means adjacent said surface and arranged to be disposed between said stacks including means for feeding cards to said fed position from said first stack in one direction and simultaneously returning cards from said fed position to said second stack in the opposite direction.

5. Card handling mechanism comprising continuously operating feeding means, a reciprocating shuttle adjacent said feeding means; means for presenting a stack of cards to said shuttle; means at one side of said shuttle for engaging the edge of the end card of a stack for moving the same edgewise towards said feeding means; and means adjacent the opposite side of said shuttle for engaging the edges of cards adjacent the feeding means and tamping them back into alignment with the stack as the shuttle retracts from a feeding motion.

6. Card handling mechanism as set forth in claim 5 in which said tamping means includes a finger movable on the shuttle and spring urged into a position to overlie the end of the stack.

7. Card handling means as set forth in claim 6 which further includes cam means associated with said finger for retracting the same in response to the motion of said shuttle in a feeding direction.

8. Card handling mechanism comprising a magazine for a holding a first stack of cards to be fed to a fed position and for storing the cards in a second stack as they are collected upon return from fed position; a card feeding means adjacent said magazine and arranged to be disposed between said stacks including means for feeding cards from one stack in one direction and returning cards to said second stack in the opposite direction; and movable means cooperable with a card in fed position for carrying the same laterally to a work position and back to fed position between cycles of operation of said feeding means.

9. Card handling mechanism as set forth in claim 8 in which said movable means is a carriage provided with means for holding a card and shiftable between a home position in which it can receive a card moved to fed position by said feeding means, and at least one working position, and which further includes means for automatically shifting said carriage between said home position and a working position, and vice versa, in response to completion of feeding operation and a working operation respectively.

10. Card handling mechanism according to claim 9 in which said last named means includes means for shifting said carriage to a plurality of working positions whereby the card may be operated on at a plurality of places by a stationary work mechanism.

11. Card handling mechanism comprising a movable magazine for holding a first stack of cards to be fed to a stopping position and for storing cards in a second stack as they are collected upon return from the stopping position; and a card feeding assembly adjacent said magazine and arranged to be disposed between said stacks, said card feeding assembly including: a continuously rotating main feed roller; a pair of auxiliary feed rollers cooperable with the main feed roller on opposite sides thereof, to form a first and second pair of feed rollers, a shuttle reciprocating adjacent the end of said first stack for stripping the end card from said first stack and moving it into the nip of said first roller pair; means for grasping the card as it leaves said first roller pair; means for moving said grasping means for positioning the card in the desired stopping position; means for locking and registering the card at said stopping position, said grasping means and moving means having reciprocatory movement whereby on the return stroke the grasping means serves to push the card from stopping position into the nip of said second pair for feeding thereby to the end of said second card stack on said magazine.

12. Card handling mechanism as set forth in claim 11 in which means is provided for causing the grasping means and the moving means therefor to move towards the feed rollers substantially simultaneously with the movement of the shuttle towards the feed rollers whereby one card is fed from stopping position to said second stack at about the same time that the next subsequent card is fed from the first stack to said stopping position.

13. Card handling mechanism as set forth in claim 12 which further includes a carriage movable between a home position and at least one working position and cooperable in its home position with a card in said stopping position for carrying the same laterally to a work position and back to the stopping position between cycles of operation of said feeding assembly; and means for automatically shifting said carriage between said home position and a working position, and vice versa, in response to completion of feeding operation and a working operation respectively.

14. Card handling mechanism according to claim 13 in which said last named means includes means for shifting said carriage to a plurality of working positions whereby the card may be operated on at a plurality of places by a stationary work mechanism.

15. Card handling mechanism comprising a movable magazine for holding a supply stack of cards; means for separating and feeding a card edgewise from the stack at one end face thereof and for returning the card edgewise to a position on the magazine adjacent and parallel to but spaced from the said end face of the supply stack to form with other returned cards a collection stack of cards; and means to effect movement of the magazine substantially in proportion to the number of cards fed in order to distribute the magazine capacity between the two stacks of cards at any stage in the operation substantially in accordance with the number of cards in each stack.

16. Card handling mechanism as set forth in claim 15 in which said magazine moving means comprises stop means adjacent said card separating means arranged for contact with the end card of said supply stack, and means for urging said magazine in a direction to maintain said end card against said stop means.

17. Card handling mechanism as set forth in claim 16 in which said magazine includes an adjustable wall positionable adjacent the card feeding means prior to feeding operation to provide for adjusting the equipment to accommodate the number of cards in any particular assignment.

18. Card handling mechanism comprising a main feed roller operable in one direction of rotation; two auxiliary feed rollers at opposite sides of the main feed roller forming therewith two feed roller pairs operating in opposite feeding directions; a first means for moving a card edgewise towards and into the nip of the first pair for feeding the card in one direction; and a second means operative after a card has cleared the first pair for moving the card edgewise towards and into the nip of the second pair for feeding the card in the reverse direction, said two cards moving means being operable substantially simultaneously to cause the feeding by the feed rollers of two successive cards in opposite directions substantially simultaneously.

19. Card handling mechanism comprising a main feed roller operable in one direction of rotation; two auxiliary feed rollers at opposite sides of the main feed roller forming therewith two feed roller pairs operating in opposite feeding directions; a first means for moving a card edgewise towards and into the nip of the first pair for feeding the card in one direction; a second means operative after a card has cleared the first pair for moving the card edgewise towards and into the nip of the second pair for feeding the card in the reverse direction; a single card magazine arranged for movement adjacent said feed rollers, transversely of the roller axis and of the direction of card feed inspired by said roller pairs; and means for urging said magazine to a position in which the terminal card of a stack held thereon is in position to cooperate with said first card moving means, and a portion of said magazine is readied to receive a card from the nip of the second pair.

20. Card handling mechanism comprising a main feed roller operable in one direction of rotation; two auxiliary feed rollers at opposite sides of the main feed roller forming therewith first and second feed roller pairs operating in opposite feeding directions; a first means for moving a card edgewise towards and into the nip of the first pair for feeding the card in one direction; and a second card moving means including means for grasping a card as it emerges from between the first pair, and means for moving the card grasping means first in said emerging direction to remove the card from the first pair and then in a reverse direction to cause the card grasping means to push the card towards the second pair.

21. Card handling mechanism comprising continuously operating feed rolls; means for moving a card edgewise into the nip of the feed rollers; means for grasping the card as it leaves the feed rollers; means for moving said grasping means for positioning the card in a desired stopping position; card stopping and sensing means so located that the edge of the card is moved against the same by the grasping means to locate the card, and mounted for displacement between card stopping position and an inactive position beyond the card stopping position; means controlled by said sensing means to give indication in case the card fails to reach the desired stopping position; and a lost motion connection between the card stopping and sensing means and said moving means such that additional movement of the moving means beyond the position in which the card is placed in desired stopping position by the card grasping means, also effects withdrawal of the stopping and sensing means from card stopping position.

References Cited by the Examiner

UNITED STATES PATENTS

| | | | |
|---|---|---|---|
| 1,848,448 | 3/32 | Weidner | 270—68 |
| 2,579,281 | 12/51 | Tuck | 271—3 X |
| 2,625,101 | 1/53 | Gammeter | 101—230 |
| 2,901,246 | 8/59 | Wagner | 271—3 |
| 2,937,020 | 5/60 | Layden | 271—59 X |
| 3,034,643 | 5/62 | Keller et al. | 209—111.5 X |

ROBERT B. REEVES, *Primary Examiner.*

SAMUEL F. COLEMAN, *Examiner.*